United States Patent
Jose et al.

(10) Patent No.: US 9,489,417 B2
(45) Date of Patent: Nov. 8, 2016

(54) AUTO-SEARCH TEXTBOX IN A CONTENT SUBMISSION SYSTEM

(71) Applicants: Aby Jose, Kerala (IN); Vikas Gupta, Jaipur (IN)

(72) Inventors: Aby Jose, Kerala (IN); Vikas Gupta, Jaipur (IN)

(73) Assignee: SAP SE, Walldorf (DE)

( * ) Notice: Subject to any disclaimer, the term of this patent is extended or adjusted under 35 U.S.C. 154(b) by 232 days.

(21) Appl. No.: 13/927,396

(22) Filed: Jun. 26, 2013

(65) Prior Publication Data

US 2015/0006524 A1 Jan. 1, 2015

(51) Int. Cl.
*G06F 7/00* (2006.01)
*G06F 17/30* (2006.01)

(52) U.S. Cl.
CPC .................. *G06F 17/30389* (2013.01)

(58) Field of Classification Search
CPC ............ G06F 17/279; G06F 17/3089; G06F 21/316; G06F 2221/2103; G06F 9/4446; G06F 17/30864; G06F 17/30867; G06F 17/30011; G06Q 10/10; G06Q 30/02
USPC .................................. 707/726, 736
See application file for complete search history.

(56) References Cited

U.S. PATENT DOCUMENTS

| 6,009,459 | A | * | 12/1999 | Belfiore ............ G06F 17/30887 707/999.01 |
| 6,651,217 | B1 | * | 11/2003 | Kennedy et al. ............. 715/224 |
| 7,366,723 | B2 | | 4/2008 | Shaburov |
| 7,383,190 | B1 | * | 6/2008 | Petruccelli et al. .......... 705/346 |
| 7,447,706 | B2 | * | 11/2008 | Chtcherbatchenko ................... G06F 17/2247 |
| 7,499,940 | B1 | * | 3/2009 | Gibbs ............... G06F 17/30887 |
| 7,634,741 | B2 | | 12/2009 | Klein |
| 7,778,854 | B2 | * | 8/2010 | Strauch .................. G06Q 10/06 705/7.13 |
| 7,987,176 | B2 | | 7/2011 | Latzina et al. |
| 8,117,196 | B2 | | 2/2012 | Jones et al. |
| 8,181,104 | B1 | | 5/2012 | Helfand et al. |
| 8,229,944 | B2 | | 7/2012 | Latzina |
| 8,356,046 | B2 | | 1/2013 | Hille-Doering et al. |
| 2002/0109712 | A1 | * | 8/2002 | Yacovone et al. ............ 345/732 |
| 2003/0126136 | A1 | | 7/2003 | Omoigui |
| 2007/0061701 | A1 | | 3/2007 | Thieberger et al. |
| 2007/0226168 | A1 | | 9/2007 | Mukundan et al. |
| 2009/0070712 | A1 | | 3/2009 | Schubert et al. |
| 2009/0077091 | A1 | | 3/2009 | Khen et al. |
| 2009/0132500 | A1 | * | 5/2009 | Jones ................ G06F 17/30864 |
| 2010/0002865 | A1 | * | 1/2010 | Kennedy et al. ........ 379/265.11 |
| 2010/0100371 | A1 | * | 4/2010 | Yuezhong et al. ................. 704/9 |
| 2012/0011147 | A1 | * | 1/2012 | Gupta ............... G06F 17/30663 707/769 |
| 2013/0067430 | A1 | | 3/2013 | Mayer-Ullmann |
| 2013/0198196 | A1 | * | 8/2013 | Myslinski ..................... 707/740 |

FOREIGN PATENT DOCUMENTS

EP 0687989 A2 12/1995

* cited by examiner

*Primary Examiner* — Robert Beausoliel, Jr.
*Assistant Examiner* — Michael Pham
(74) *Attorney, Agent, or Firm* — Schwegman Lundberg & Woessner, P.A.

(57) ABSTRACT

Systems and methods for providing an auto-search text box in a content submission system are provided. In example embodiments, a message interface that is used to submit content to a content submission system is provided. The message interface includes a short text field that receives at least one keyword that summarizes the content to be submitted. In response to completion of entry of the at least one keyword in the short text field, a search of a content database for previously submitted content that matches the at least one keyword is automatically performed. Based on the search, a results list is displayed in proximity to the short text field on the message interface. The results list comprises a title and a link for each result in the results lists.

20 Claims, 9 Drawing Sheets

| CREATE MESSAGE | | | |
|---|---|---|---|
| ☐ DESCRIPTION ☐ ACTION LOG | | | |

| REPORTER | SYSTEM ENVIRONMENT | | |
|---|---|---|---|
| ADDRESS OF REPORTER | SYSTEM ☐ RELEASE ☐ | CLIENT ☐ NW RELEASE ☐ | |
| NAME OF REPORTER | SENSITIVE ☐ | INFO ☐ | |
| CONTACT INFO | TEST SER. [    ] | | |

0120061532 00000000 2013 ENTERED ON 23.01.2013 16:01:37 (UTC+53)

COMPONENT [     ]   PRIORITY MEDIUM   (NOTES)
                    STATUS NEW        (REFS.)

PROCESSOR [          ]
SHORT TEXT  KEYWORDS                    302   LANGUAGE EN
DESCRIPT    [                                              ]
            [                                              ]
            [                                              ]
            [                                              ]
            [                                              ]
            [                                              ]
            [                                              ]
            [                                              ]
            [                                              ]
            [                                              ]

| CREATE MESSAGE | |
|---|---|
| ☐ DESCRIPTION ☐ ACTION LOG | |

| REPORTER | SYSTEM ENVIRONMENT |
|---|---|
| ADDRESS OF REPORTER<br><br>NAME OF REPORTER<br><br>CONTACT INFO | SYSTEM ☐    CLIENT ☐<br>RELEASE ☐<br>                  NW RELEASE ☐<br>SENSITIVE ☐    INFO ☐<br>TEST SER. ☐ |

0120061532 00000000 2013 ENTERED ON 23.01.2013 16:01:37 (UTC+53)

COMPONENT ☐    PRIORITY MEDIUM ☐   ( NOTES )

STATUS NEW ☐   ( REFS. )

PROCESSOR ☐

SHORT TEXT | Messages are not getting processed | LANGUAGE EN

DESCRIPT | Hello,

502 | The messages are getting stuck in the queues and the
| status of the message show as application error.
| Please look into the issue at the earliest convenience.
| The server details are as follows:
| Server IP: 001.001.001.001
| Port is: 10010
| URL: http://001.001.001.001:10010/dir
| User Credentials: xyzuser/password
| Message ID: 7728ww2342234jd773j003

| CREATE MESSAGE | | | |
|---|---|---|---|
| ☐ DESCRIPTION ☐ ACTION LOG | | | |

| REPORTER | SYSTEM ENVIRONMENT | | |
|---|---|---|---|
| ADDRESS OF REPORTER | SYSTEM ☐ RELEASE ☐ | CLIENT ☐ | |
| NAME OF REPORTER | SENSITIVE ☐ | NW RELEASE ☐ INFO ☐ | |
| CONTACT INFO | TEST SER. [____] | | |

0120061532 00000000 2013 ENTERED ON 23.01.2013 16:01:37 (UTC+53)

COMPONENT [____] PRIORITY MEDIUM ☐ (NOTES)
STATUS NEW ☐ (REFS.)
PROCESSOR [____]
SHORT TEXT [Get stuck into error message] LANGUAGE EN ☐
DESCRIPT Technical information Test Plan Title [____]
Test Package Title Sprint10
Test Case Name Dummy_Case_Sprint9
Test Case Title dummy Describe your procedure in detail
Application server: [____]
ABAP server: Q72

AUTO-SEARCH TEXTBOX IN A CONTENT SUBMISSION SYSTEM

FIELD

The present disclosure relates generally to content submission and, in a specific example embodiment, to an auto-search textbox in a content submission system.

BACKGROUND

Generally, a user may create and submit a message regarding an issue without realizing that a similar message has already been reported by another individual. This is a potential waste of time and resources for the user as well as for an administrator that is tasked with analyzing the issue. Traditional systems do not provide a way for the user to efficiently determine if similar issues have been reported.

BRIEF DESCRIPTION OF DRAWINGS

Various ones of the appended drawings merely illustrate example embodiments of the present invention and cannot be considered as limiting its scope.

FIG. 3 is an example screenshot of a message interface having an auto-search textbox.

FIG. 4 is an example screenshot of the message interface presenting a result list.

FIG. 5 is an example screenshot of the message interface illustrating populating of fields.

FIG. 6 is an example screenshot of the message interface presenting a previously submitted message.

DETAILED DESCRIPTION

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Systems and methods to provide an auto-search textbox in a content submission system are provided. As a user enters keywords that summarize new content that they would like to submit to the content submission system, a search of a content database may be automatically performed to identify any similar previously submitted content (e.g., previously submitted messages). The search is conducted via the same interface as used to submit new content. As such, the user does not need to access a separate search system, user interface, or session to determine whether similar content has previously been submitted and then return to the interface to submit the new content. In example embodiments, a results list of similar previously submitted content may be returned to the user based on the search performed with the submitted keywords. In example embodiments, the user may select a title from the results list which causes a portion of the interface (e.g., a description portion or description template) to be automatically populated with information from the previously submitted content corresponding to the selected title. Alternatively, the user may select a link from the results list which provides a view of a copy of the previously submitted content.

As such, by using example embodiments, the user can quickly identify whether similar content has been previously submitted. Furthermore, if similar content has been previously submitted, data from the similar content may be used to automatically populate one or more fields of a portion of the message interface (e.g., a description template). From there, the user may simply submit or edit the fields that were automatically populated. Accordingly, one or more of the methodologies discussed herein may obviate a need for time-consuming manual input of information and reduce redundant content submissions, which may have the technical effect of reducing computing resources used by one or more devices within the system. Examples of such computing resources include, without limitation, processor cycles, network traffic, memory usage, storage space, and power consumption.

Figure 1:
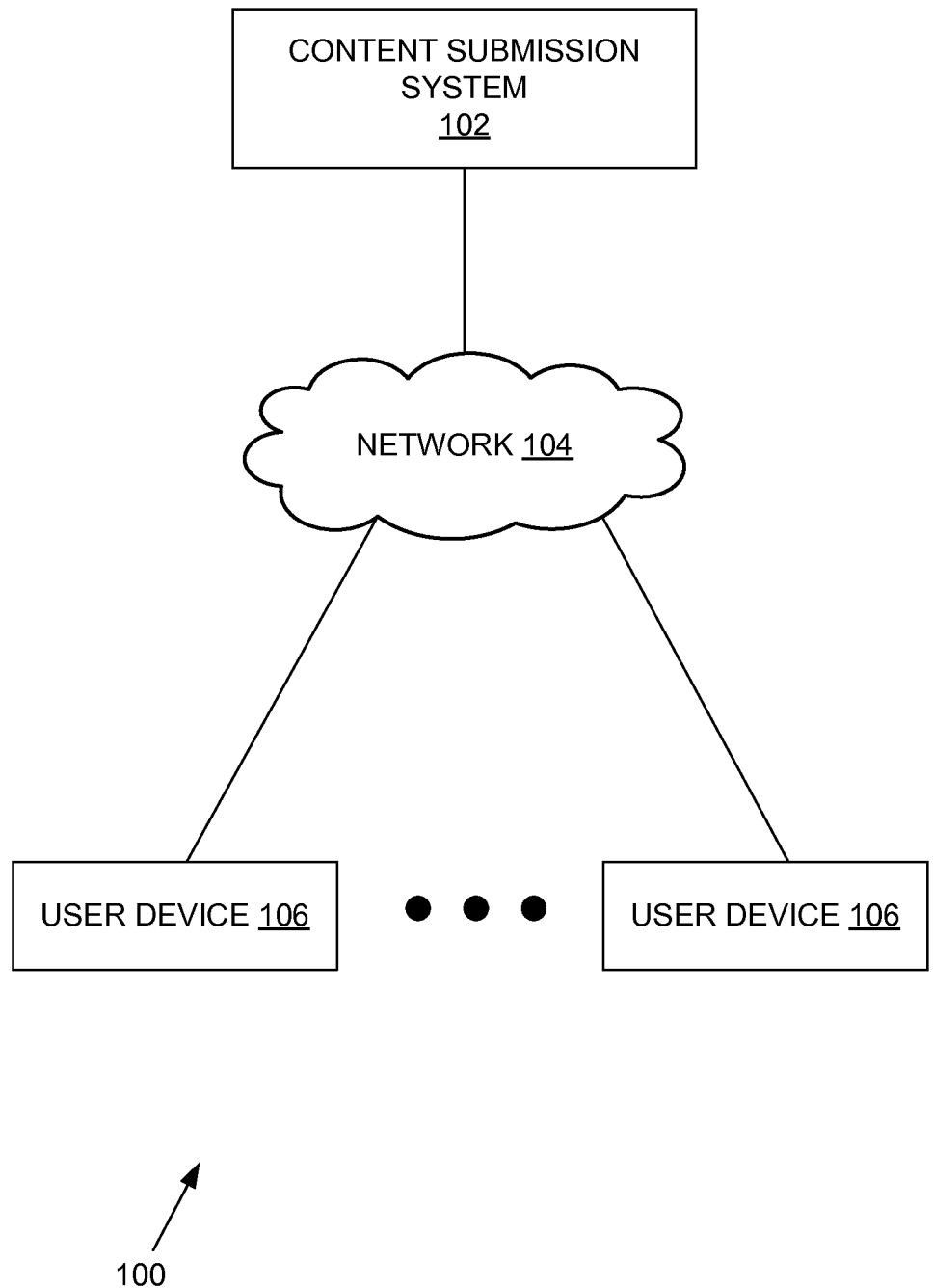
FIG. 1 illustrates an environment in which example embodiments of the inventive subject matter may be practiced.

With reference to FIG. 1, an environment 100 in which example embodiments of the inventive subject matter may be practiced is shown. The environment 100 comprises a content submission system 102 communicatively coupled via a network 104 to a plurality of user devices 106. In example embodiments, the user devices 106 (e.g., laptop, desktop computer, tablet, or any other computing device) are linked via the network 104 with the content submission system 102 to allow for exchange of information between the user devices 106 and the content submission system 102. Accordingly, the network 104 may comprise the Internet, a wireless network, a cellular network, a Wide Area Network (WAN), a local area network (LAN), or any other type of network that enables communication between computing devices.

In one embodiment, the content submission system 102 manages and logs content submitted by various users at the user devices 106. The content may comprise, for example, notes, reporting of issues or defects, incident tickets, or any other messages that the content submission system 102 may manage. As such, the content submission system 102 receives the submitted content from the user devices 106 and stores the submitted content for analysis. Subsequently other users (e.g., administrators) may access the stored content and perform required analysis and subsequent actions. Additionally, the content submission system 102 may provide information such as previously submitted content, to users at the user device 106. The content submission system 102 will be discussed in more detail in connection with FIG. 2.

The environment 100 of FIG. 1 is merely an example, and alternative embodiments may comprise any number of content submission systems 102 communicatively coupled to any number of user devices 106. Furthermore, components and functions of the content submission system 102 and the user device 106 may be combined, separated, or located elsewhere in the environment 100 (e.g., some components shown as part of the content submission system 102 may be located at the user device 106 or vice-versa). Further still, the functionalities of the content submission system 102 may be combined with the user device 106 into a single device or machine.

Figure 2:
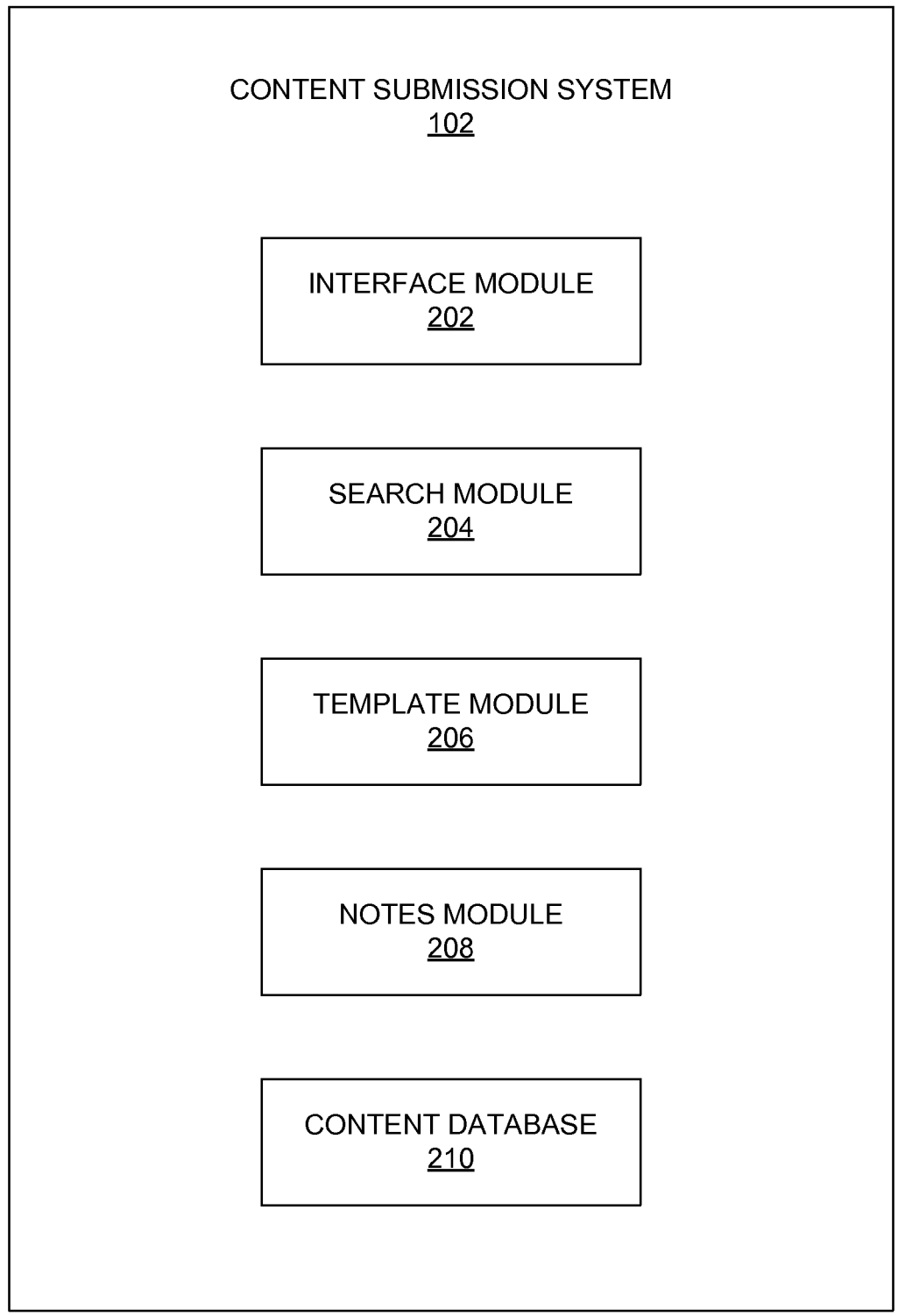
FIG. 2 is a block diagram illustrating components of a content submission system of the environment of FIG. 1.

FIG. 2 is an example block diagram illustrating examples components of the content submission system 102 of the environment of FIG. 1. The content submission system 102 manages content submitted by various users and provides access to previously submitted content. To enable these functionalities, the content submission system 102 may comprise an interface module 202, a search module 204, a template module 206, a notes module 208, and a content database 210. Components not directly related to the functionalities of example embodiments have not been included in order to simplify discussion of the content submission system 102. In one example embodiment, the content submission system 102 is a customer service system (e.g., for reporting issues).

The interface module 202 manages information exchange with the user devices 106. In example embodiments, the interface module 202 may provide a user interface (also referred to as a "message interface") that allows a user at the user device to submit content, such as messages. The user interface may include a short text field where the user may provide keywords that summarize the content that the user wants to submit. The user interface may also provide a description portion where the user may provide detailed content for submission. Examples of various user interfaces will be discussed in more detail in connection with FIG. 3-FIG. 6 below.

The search module 204 manages searches of the content database 210 of the content submission system 102. In example embodiments, the user may enable an automatic search (auto-search) feature associated with the user interface through which the user submits content to the content submission system 102. When the auto-search feature is enabled, the search module 204 may automatically perform a search using keywords that the user has entered into a short text field in the user interface. In some cases, the user does not need to perform any actions to trigger the search when the keywords are entered. In other words, a text field may be already enabled to perform the auto-search feature. Instead, the search module 204 may automatically, without human intervention, take the keywords as the user is entering them or upon completion of entering the keywords (without a triggering event such as selection of a search button) and performs the search of the content database 210.

The results of the search may be returned to the user as a results list in a drop down menu. Alternatively, the results list may be provided in other forms such as in a popup window or along a perimeter of the user interface. In example embodiments, the results list may comprise one or more titles of similar previously submitted content that match the keywords from the short text field. Next to each title may be a link that provides access to the previously submitted content. Upon selection of the link, the search module 204 may retrieve at least a portion of the previously submitted content corresponding to the link (e.g., a submitted description content), and the interface module 202 may display the retrieved previously submitted content in a new window or other location. The user may then view a complete copy of the previously submitted content.

If the user selects the title in the results list of returned search results, the template module 206 automatically populates a description portion of the user interface with the retrieved previously submitted content corresponding to the selected title. As a result, the user may use the automatically populated information to submit a new message either as-is or after some editing of the information. For example, if the new content that the user wants to submit concerns a similar issue (e.g., a component was failing earlier and it is failing again), the user may use data that was previously submitted (e.g., from an old ticket) as a template for submitting the new content. The new content may be, for example, an announcement or an additional piece of information related to the previously submitted content. The newly submitted content may then be linked to the previously submitted content in the content database 210 by the template module 206.

The notes module 208 manages notes associated with previously submitted content. In example embodiments, the notes provide background or context for particular content. For example, if a hard fix for an issue is utilized, a note may be provided indicating how to implement the hard fix. These notes may be stored in the content database 210 and linked to the previously submitted content (e.g., message, ticket). As such, a user may search the notes before submitting new content by selecting a "notes" button. In some embodiments, the selection of the "notes" button may automatically trigger performance of a search by the notes module 208 using the keywords provided in the short text field or may automatically populate a notes search text box with the keywords from the short text field. Alternatively, the user may be provided the notes search text box where keywords for a note search may be manually entered.

The content database 210 stores the previously submitted content along with corresponding notes. While the content database 210 is shown to be embodied within the content submission system 102, alternative embodiments may locate the content database 210 outside of the content submission system 102 but coupled thereto. Additionally, the content database 210 may be embodied within one or more data repositories or storage devices.

FIG. 3 is an example screenshot of a message interface 300 having an auto-search textbox in the form of a short text field 302. The user may type one or more keywords into the short text field 302 that summaries or describes at a high level the content the user wants to submit. According to one embodiment, as soon as the user completes typing a word or words in the short text field 302 and without a search triggering event (e.g., selection of a search button or an enter button), the word(s) are taken and used to search the content database 210 by the search module 204.

Figure 4:
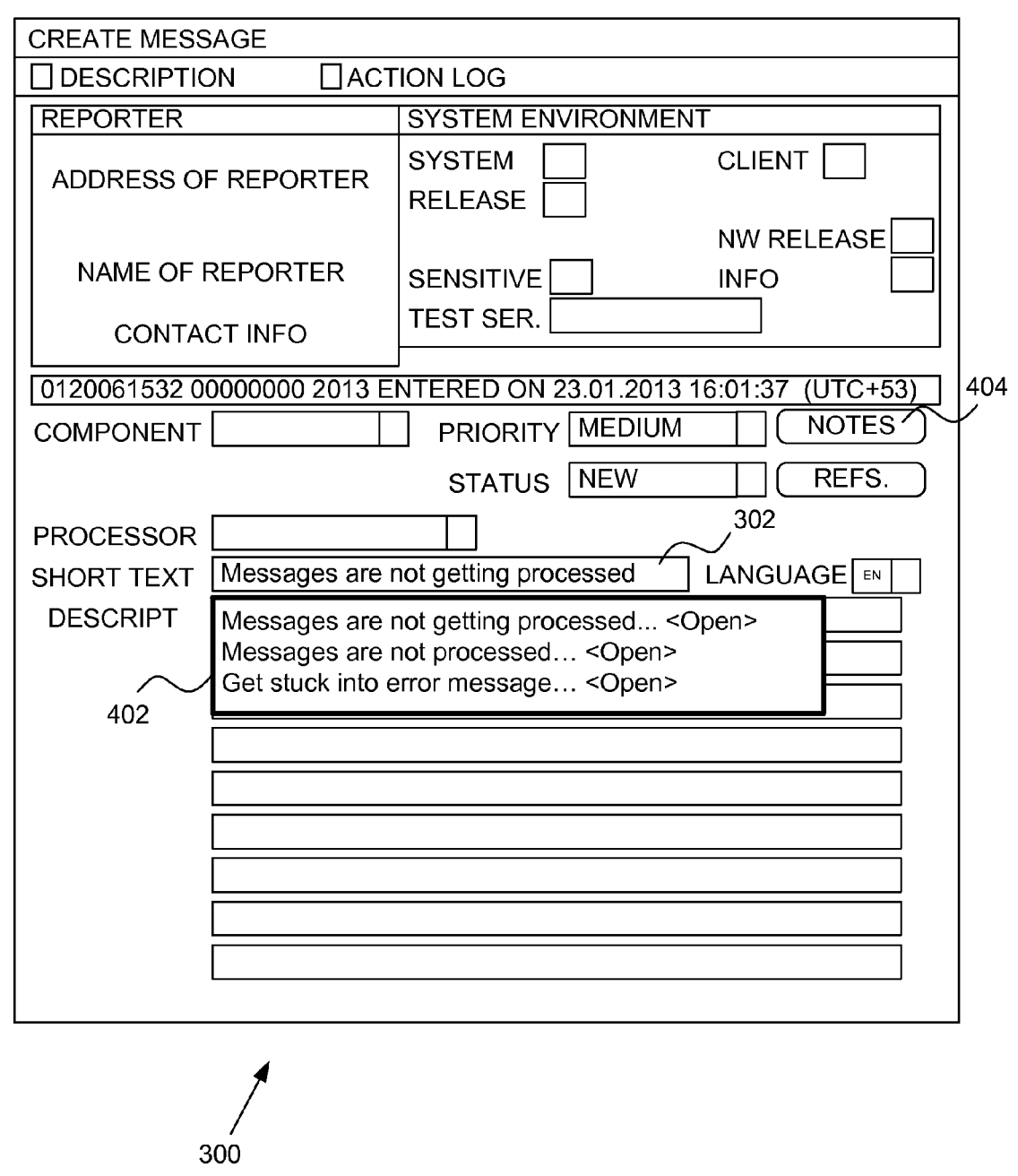

Referring to FIG. 4, an example screenshot of the message interface 300 is shown presenting a results list 402. In example embodiments, the results list 402 is a drop down menu positioned approximate to (e.g., below) the short text field 302. Alternatively, the results list 402 may be provided in other forms such as in a popup window or along a perimeter of the message interface 300. The results list 402 provides a list of similar previously submitted content based on the keywords entered into the short text field 302. The list includes a title of the previously submitted content and a link or hyperlink (e.g., shown as "<Open>") that provides access to the previously submitted content.

For example, as the user completes typing keywords "Messages are not getting processed" into the short text field 302, the search module 204 performs a search of the content database 210 using these keywords. The search module 204 then returns the results list 402 shown as a drop down menu below the short text field 302 in FIG. 4. The results list 402 includes titles of matching previously submitted content such as "Messages are not getting processed . . . ," "Messages are not processed . . . " and "Get stuck into error messages . . . ." Any number of results may be listed in the results list 402 and a scroll bar may be provided, for example, to navigate the results list 402.

The message interface 300 may also include a notes button 404. The selection of the notes button 404 may trigger a search for notes that are stored in the content database 310. In example embodiments, the search may be performed using the same keywords that are typed in the short text field 302. As such, a note search text box may be shown that is automatically populated with the keywords from the short text field 302 in accordance with one embodiment. The results of the notes search may be returned, for example, in a drop down menu approximate to the notes button, in a new window, or as an overlay over the message interface 300.

If the user selects one of the titles from the results list 402, a portion of the message interface 300 (e.g., description portion or description template) may be automatically populated. FIG. 5 is an example screenshot of the message interface 300 illustrating automatically populating of one or more fields. In particular, a description portion 502 of the message interface 300 is automatically populated with information from the selected previously submitted content. For example, if the user selects the title "Messages are not getting processed . . . " from the results list 402, the description portion 502 is automatically populated with the same content that was previously submitted for the selected title. Other portions of the message interface 300 may also be automatically populated with corresponding previously submitted content of the selected title. The user may then submit the content (e.g., message) using the automatically populated content or edit the automatically populated content (e.g., create an edited version) prior to submission.

FIG. 6 is an example screenshot of a message interface 600 presenting a copy of a previously submitted content. When the user selects the link (e.g., hyperlink) that is provided in the results list 402, the corresponding previously submitted content is accessed and a copy of the previously submitted content that corresponds to the selected link is displayed. In some embodiments, the message interface 600 may be presented, for example, in a new window (e.g., popup window, a new tabbed window). By providing the copy of the previously submitted content in the new window, the user can easily switch views between the message interface 300 where the user is creating a new content submission and the message interface 600 where the previously submitted content is viewable. If details of the previously submitted content are similar to content that the user now wants to submit, the user may return to the results list 402 and select the title that corresponds to the selected link, which results in the automatic population of the description portion 502 as shown in FIG. 5.

Figure 7:
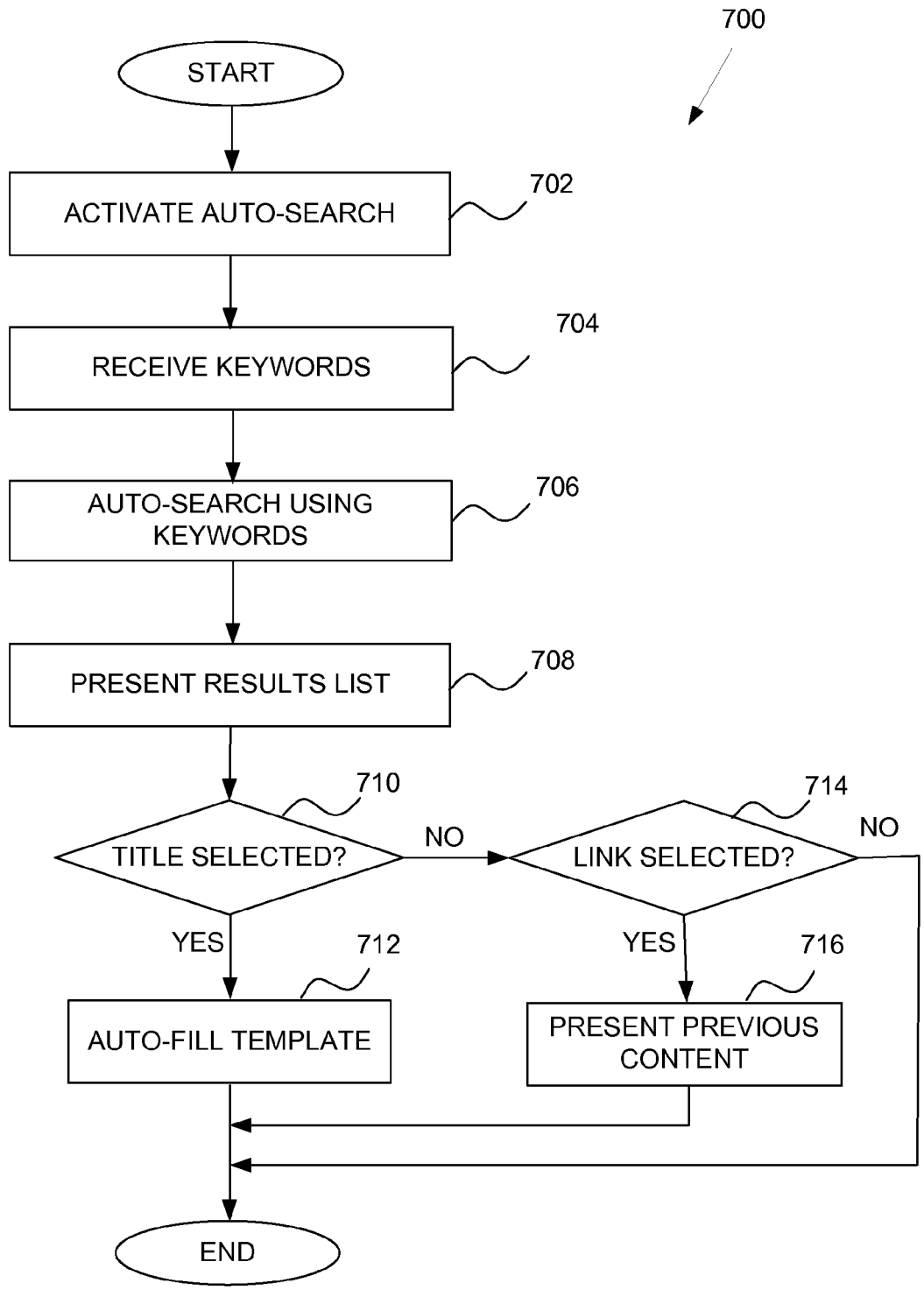
FIG. 7 is a flowchart of an example method for providing auto-searching in a content submission system.

FIG. 7 is a flowchart of an example method 700 for providing an automatic search of previously submitted content that may be similar to new content a user wants to submit to the content submission system 102. The operations of the method 700 may be performed by various components of the content submission system 102, in accordance with example embodiments. In operation 702, an auto-search feature may be activated. In some embodiments, the auto-search feature may be enabled or disabled by the user. Accordingly, a button or other input mechanism may be provided (e.g., in a toolbar) that allows the user to enable or disable the auto-search feature.

Once the auto-search feature is enabled/activated, keywords may be received in operation 704. Upon the user completing entry of one or more keywords in a short text field (e.g., short text field 302) of a message interface (e.g., the message interface 300), the keywords may be received or retrieved by the search module 204 of the content submission system 102. The receipt of the keywords from the short text field may be performed automatically without a search-triggering event.

In operation 706, the auto-search is performed by the search module 204 using the keywords. In example embodiments, the search module 204 will access the content database 210 and use the keywords to search for one or more previously submitted content (e.g., messages) that are similar to the keywords. The results are then presented in a results list in operation 708. The results list may be positioned in proximity of the short text field or anywhere associated with the message interface.

A determination is made in operation 710 as to whether a title from the results list (e.g., results list 402) is selected. If the title is selected, then a portion of the message interface (e.g., template) may be automatically populated at operation 712 with at least some of the previously submitted content. If the title is not selected, then a determination is made in operation 714 as to whether a link from the results list is selected. If the link is selected, a copy of the previously submitted content is presented to the user in operation 716. The copy of the previously submitted content may be presented in a new window (e.g., pop-up window or tabbed window) so that the user may view the previously submitted content without exiting from the message interface.

It is noted that if the title is not selected and the link is not selected, the results list may be closed or otherwise not displayed and the user is able to manually populate the message interface. For example, the user may close the display of the results list without selecting a title or link.

Figure 8:
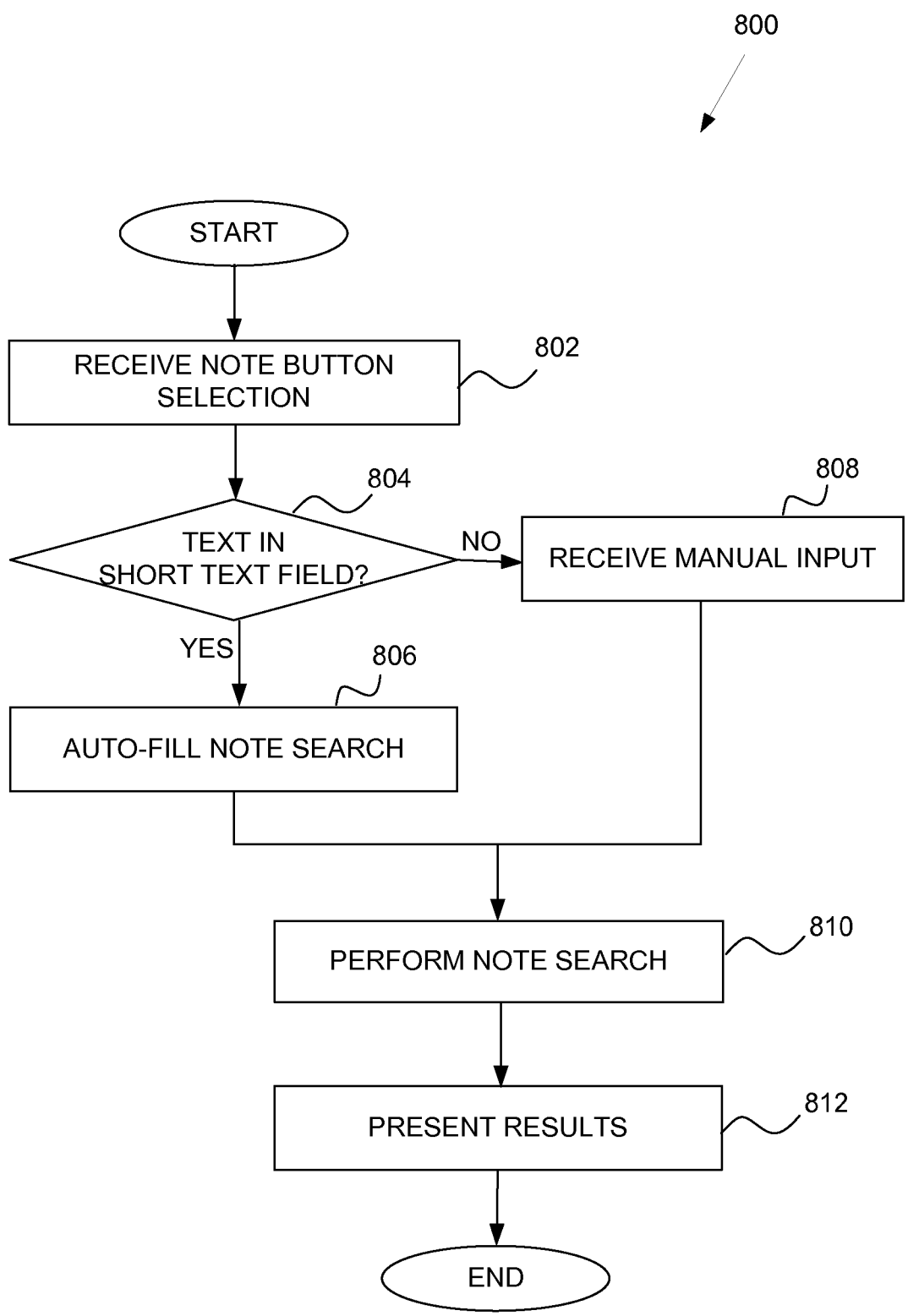
FIG. 8 is a flowchart of an example method for providing auto-searching of notes.

FIG. 8 is a flowchart of an example method 800 for providing auto-searching of notes stored in the content database 310. The notes may provide a background for particular submitted content. For example, if a hard fix for a technological bug/error is utilized, a note may be provided indicating how to implement the fix.

In operation 802, a note button selection is received. Accordingly, a user may search the notes by selecting a "notes" button on the message interface. In operation 804, a determination is made as to whether keywords are provided in the short text field. If keywords are provided in the short text field, the keywords from the short text field may be used to automatically populate a note search text box and/or used to automatically perform the search for matching notes in operation 806.

If no text is entered into the short text field, then in operation 808, manually inputted keywords are received from the user. For example, a note search text box (or field) may be provided in or overlaid over the message interface where the user may manually enter keywords with which to perform a note search.

Using the keywords (either automatically obtained from the short text field or from the manual input), the notes module 208 performs a search in operation 810 of the content database 310 for notes that are similar or match the keywords. The results are presented in operation 812.

Figure 9:
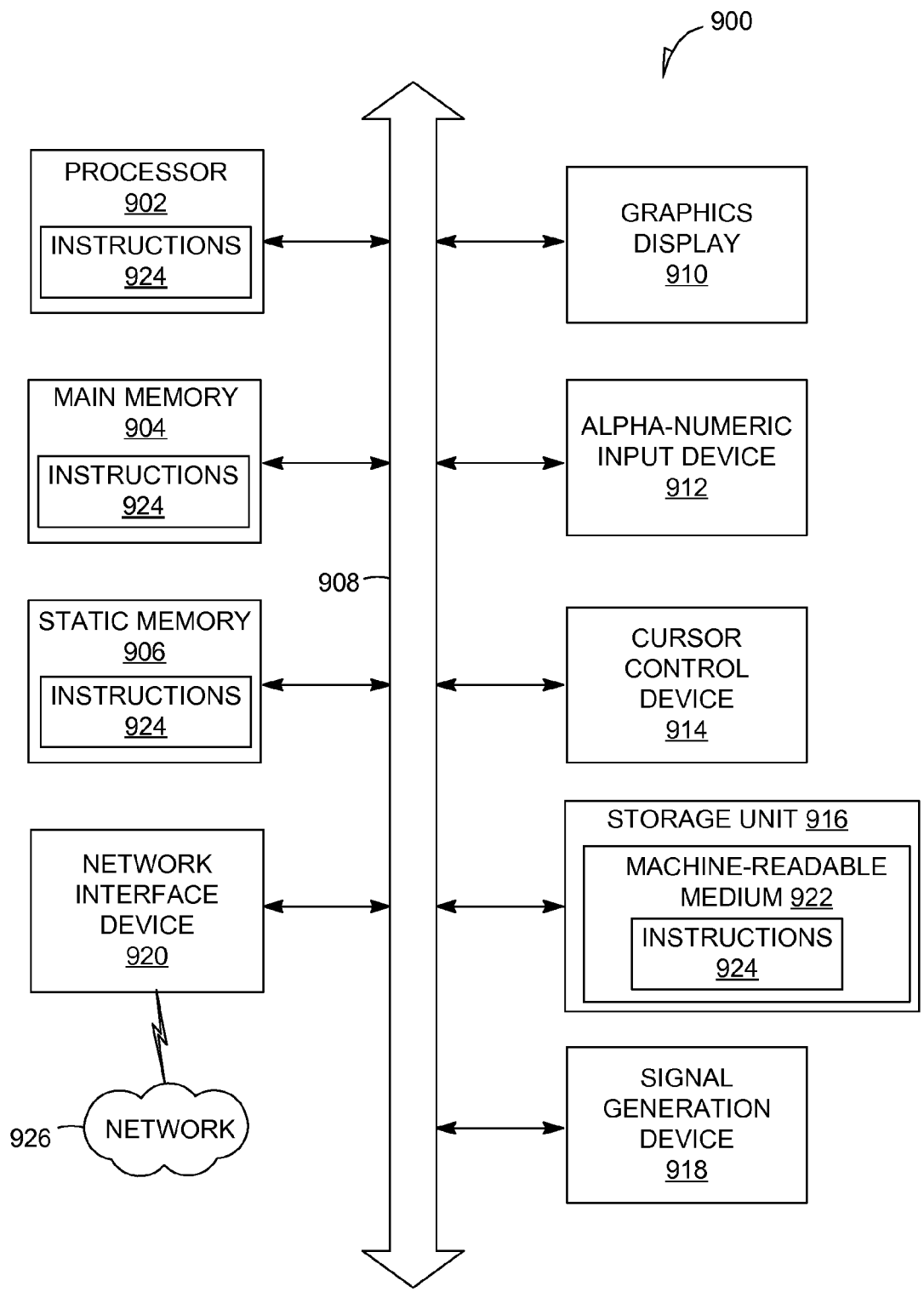
FIG. 9 is a simplified block diagram of a machine in an example form of a computing system within which a set of instructions for causing the machine to perform any one or more of the methodologies discussed herein may be executed.

FIG. 9 is a block diagram illustrating components of a machine 900, according to some example embodiments, able to read instructions from a machine-readable medium (e.g., a tangible machine-readable storage medium) and perform any one or more of the methodologies discussed herein. Specifically, FIG. 9 shows a diagrammatic representation of the machine 900 in the example form of a computer system and within which instructions 924 (e.g., software, a program, an application, an applet, an app, or other executable code) for causing the machine 900 to perform any one or more of the methodologies discussed herein may be executed. In alternative embodiments, the machine 900 operates as a standalone device or may be connected (e.g., networked) to other machines. In a networked deployment, the machine 900 may operate in the capacity of a server machine or a client machine in a server-client network environment, or as a peer machine in a peer-to-peer (or distributed) network environment. The machine 900 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 924, sequentially or otherwise, that specify actions to be taken by that machine. Further, while only a single machine is illustrated, the term "machine" shall also be taken to include a collection of machines that individually or jointly execute the instructions 924 to perform any one or more of the methodologies discussed herein.

The machine 900 includes a processor 902 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 904, and a static memory 906, which are configured to communicate with each other via a bus 908. The machine 900 may further include a graphics display 910 (e.g., a plasma display panel (PDP), a light emitting diode (LED) display, a liquid crystal display (LCD), a projector, or a cathode ray tube (CRT)). The machine 900 may also include an alpha-numeric input device 912 (e.g., a keyboard), a cursor control device 914 (e.g., a mouse, a touchpad, a trackball, a joystick, a motion sensor, or other pointing instrument), a storage unit 916, a signal generation device 918 (e.g., a speaker), and a network interface device 920.

The storage unit 916 includes a machine-readable medium 922 on which is stored the instructions 924 embodying any one or more of the methodologies or functions described herein. The instructions 924 may also reside, completely or at least partially, within the main memory 904, within the processor 902 (e.g., within the processor's cache memory), or both, during execution thereof by the machine 900. Accordingly, the main memory 904 and the processor 902 may be considered as machine-readable media. The instructions 924 may be transmitted or received over a network 926 via the network interface device 920.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 922 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 900), such that the instructions, when executed by one or more processors of the machine (e.g., processor 902), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

The instructions 924 may further be transmitted or received over a communications network 926 using a transmission medium via the network interface device 920 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMAX networks). The term "transmission medium" shall be taken to include any intangible medium that is capable of storing, encoding, or carrying instructions for execution by the machine, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
  causing presentation of a message interface that is used, by a user, to report an issue affecting the user to a content submission system, the message interface including a short text field that receives at least one keyword that summarizes the issue being reported and a separate description field for textual input of a description of the issue being reported;
  receiving a selection that turns on an auto-search feature, the auto-search feature triggering the content submission system to automatically search a content database in response to completion of entry of the at least one keyword in the short text field that summarizes the issue being reported, the search automatically being performed without receiving a selection of a button that triggers the search;
  detecting completion of entry of the at least one keyword in the short text field;
  automatically based on the auto-search feature being turned on and without receiving the selection of a button that triggers the search, performing, using a processor of a machine, the search of a content database for previously submitted content comprising one or more issues reported by other users that matches the at least one keyword that summarizes the issue being reported, the previously submitted content being previously submitted messages reporting issues to the content submission system; and based on the search, causing display of a results list in proximity to the short text field on the message interface, the results list comprising a selectable title and a separately selectable link for each result in the results list that corresponds to the previously submitted content that matches the at least one keyword that summarizes the issue being reported.

2. The method of claim 1, further comprising:

receiving a selection of one selectable title from the results list;

accessing the content database to retrieve at least a portion of the previously submitted content that corresponds to the selected title; and automatically populating the description field of the message interface using the portion of the previously submitted content the automatically populating of the description field used to generate and submit a new message reporting the issue.

3. The method of claim 1, wherein the new message comprises an incident ticket.

4. The method of claim 2, further comprising receiving a submission of the new message reporting the issue that includes a version of the portion of the previously submitted content that was populated into the description field of the message interface.

5. The method of claim 4, further comprising linking the submission of the new message reporting the issue with the previously submitted content from which the portion of the previously submitted content is used to populate the description field, the linking occurring in the content database.

6. The method of claim 2, further comprising:

receiving at least one edit to the version of the portion of the previously submitted content populated into the description field of the message interface; and submitting the edited version as part of the new message reporting the issue, the new message reporting the issue being linked to the previously submitted content from which the portion of the previously submitted content is used to populate the description field, the linking occurring in the content database.

7. The method of claim 1, further comprising:

receiving a selection of one selectable link from the results list;

accessing the content database to retrieve the previously submitted content that corresponds to the selected selectable link; and causing display of a copy of the previously submitted content that corresponds to the selected selectable link in a new window.

8. The method of claim 1, further comprising:

receiving an indication of activation of a notes button;

detecting whether the at least one keyword is present in the short text field;

based on the at least one keyword being present in the short text field, performing a search for notes that match the at least one keyword from the short text field; and based on the at least one keyword not being present in the short text field, performing the search for the notes using manually entered note search terms, the notes providing background or context for the previously submitted content linked to the notes.

9. The method of claim 8, further comprising causing a note search text box to be displayed, wherein based on the at least one keyword being present in the short text field, the note search text box is automatically populated with the at least one keyword present in the short text field.

10. The method of claim 1, wherein the display of the results list in proximity to the short text field on the message interface comprises displaying the results list in a drop down menu adjacent to the short text field.

11. The method of claim 1, further comprising:

receiving a submission of the new message reporting the issue via the message interface; and storing the submitted new message reporting the issue in the content database, the submitted new message reporting the issue now being previously submitted content for a future search.

12. A non-transitory machine-readable storage medium storing instructions which, when executed by at least one processor of a machine, cause the machine to perform operations comprising:

causing presentation of a message interface that is used, by a user, to report an issue affecting the user to a content submission system, the message interface including a short text field that receives at least one keyword that summarizes the issue being reported and a separate description field for textual input of a description of the issue being reported;

receiving a selection that turns on an auto-search feature, the auto-search feature triggering the content submission system to automatically search a content database in response to completion of entry of the at least one keyword in the short text field that summarizes the issue being reported, the search automatically being performed without receiving a selection of a button that triggers the search;

detecting completion of entry of the at least one keyword in the short text field;

automatically, based on the auto-search feature being turned on and without receiving the selection of a button that triggers the search, performing the search of a content database for previously submitted content comprising one or more issues reported by other users that matches the at least one keyword that summarizes the issue being reported, the previously submitted content being previously submitted messages reporting issues to the content submission system; and based on the search, causing display of a results list in proximity to the short text field on the message interface, the results list comprising a selectable title and a separately selectable link for each result in the results list that corresponds to the previously submitted content that matches the at least one keyword that summarizes the issue being reported.

13. The non-transitory machine-readable storage medium of claim 12, wherein the operations further comprise:

receiving a selection of one selectable title from the results list;

accessing the content database to retrieve at least a portion of the previously submitted content that corresponds to the selected title; and automatically populating the description field of the message interface using the portion of the previously submitted content, the automatically populating of the description field used to generate and submit a new message reporting the issue.

14. The non-transitory machine-readable storage medium of claim 12, wherein the operations further comprise:
receiving a selection of one selectable link from the results list;
accessing the content database to retrieve the previously submitted content that corresponds to the selected selectable link; and
causing display of a copy of the previously submitted content that corresponds to the selected selectable link in a new window.

15. The non-transitory machine-readable storage medium of claim wherein the operations further comprise:
receiving an indication of activation of a notes button;
detecting whether the at least one keyword is present in the short text field;
based on the at least one keyword being present in the short text field; performing a search for notes that match the at least one keyword from the short text field; and
based on the at least one keyword not being present in the short text field, performing the search for the notes using manually entered note search terms,
the notes providing background or context for the previously submitted content linked to the notes.

16. The non-transitory machine-readable storage medium of claim 13, wherein the operations further comprise:
receiving a submission of the new message reporting the issue that includes a version of the portion of the previously submitted content; and
linking the submission of the new message reporting the issue with the previously submitted content from which the portion of the previously submitted content is used to populate the description field, the linking occurring in the content database.

17. A system comprising:
a processor of a machine;
a user interface module to cause presentation of a message interface that is used, by a user, to report an issue affecting the user to a content submission system, the message interface including a short text field that receives at least one keyword that summarizes the issue being reported and a separate description field for textual input of a description of the issue being reported; and
a search module to, in response to detection of completion of entry of the at least one keyword in the short text field, automatically, based on an auto-search feature being turned on and without receiving a selection of a button that triggers a search, perform, using the processor of the machine, the search of a content database for previously submitted content comprising one or more issues reported by other users that matches the at least one keyword that summarizes the issue being reported, and to cause display of a results list in proximity to the short text field on the message interface, the results list comprising a selectable title and a separately selectable link for each result in the results list that corresponds to the previously submitted content that matches the at least one keyword that summarizes the issue being reported, the previously submitted content being previously submitted messages reporting issues to the content submission system.

18. The system of claim 17, further comprising a template module that automatically populates the description field of the message interface using a portion of the previously submitted content that is retrieved from the content database in response to receiving a selection of one selectable title from the results list, the description field used to generate and submit a new message reporting the issue.

19. The system of claim 17, wherein:
the search module is further to receive a selection of one selectable link from the results list and access the content database to retrieve the previously submitted content that corresponds to the selected selectable link; and
the interface module is to cause display of a copy of the previously submitted content that corresponds to the selected selectable link in a new window.

20. The system of claim 17, further comprising a notes module to:
receive an indication of activation of a notes button;
detect whether the at least one keyword is present in the short text field;
based on the at least one keyword being present in the short text field, perform a search for notes that match the at least one keyword from the short text field; and
based on the at least one keyword not being present in the short text field, performing the search for the notes using manually entered note search terms,
the notes providing background or context for the previously submitted content linked to the notes.

* * * * *